US012780327B2

(12) United States Patent
Kim et al.

(10) Patent No.: US 12,780,327 B2
(45) Date of Patent: Nov. 3, 2026

(54) VEHICLE BODY AND VEHICLE BODY CONNECTION JOINT FOR VEHICLE

(71) Applicants: Hyundai Motor Company, Seoul (KR); Kia Corporation, Seoul (KR)

(72) Inventors: Do Hoi Kim, Sejong (KR); Keon Chul Lee, Yongin (KR); Ju Chul Kim, Ulsan (KR); Kang Chul Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 331 days.

(21) Appl. No.: 18/402,886

(22) Filed: Jan. 3, 2024

(65) Prior Publication Data

US 2025/0091660 A1 Mar. 20, 2025

(30) Foreign Application Priority Data

Sep. 19, 2023 (KR) ........................ 10-2023-0124855

(51) Int. Cl.
*B62D 27/02* (2006.01)
*B62D 25/06* (2006.01)

(52) U.S. Cl.
CPC ........... *B62D 27/023* (2013.01); *B62D 25/06* (2013.01); *B62D 27/026* (2013.01)

(58) Field of Classification Search
CPC .... B62D 27/023; B62D 25/06; B62D 27/026; B62D 27/06; B62D 27/065; B62D 25/04; B62D 23/005
USPC .......................................................... 296/210
See application file for complete search history.

(56) References Cited

U.S. PATENT DOCUMENTS

| | | | | |
|---|---|---|---|---|
| 6,389,697 | B1 * | 5/2002 | Benoit | B62D 27/023 219/617 |
| 9,415,810 | B2 | 8/2016 | Faruque et al. | |
| 2007/0246972 | A1 | 10/2007 | Favaretto | |
| 2017/0050677 | A1 * | 2/2017 | Czinger | B62D 29/048 |
| 2019/0301520 | A1 * | 10/2019 | Dorman | F16D 1/068 |
| 2022/0073153 | A1 * | 3/2022 | Citti | B62D 33/04 |
| 2024/0199123 | A1 * | 6/2024 | Kim | B62D 21/03 |

FOREIGN PATENT DOCUMENTS

| | | | |
|---|---|---|---|
| DE | 10 2006 054 470 | A1 | 5/2008 |
| DE | 20 2017 105474 | U1 | 12/2018 |
| KR | 10-2021-0072522 | A | 6/2021 |

OTHER PUBLICATIONS

European Search Report issued Jun. 27, 2024 in corresponding Euroepan Patent Application No. 24150475.2.

* cited by examiner

*Primary Examiner* — Muhammad Shafi
(74) *Attorney, Agent, or Firm* — Fox Rothschild LLP

(57) ABSTRACT

Disclosed is a vehicle body and a vehicle body connection joint for a vehicle, and the vehicle body connection joint for a vehicle includes a support body including a roof side part extending along a roof side, a pillar part extending along a pillar, and a roof cross part extending along a roof cross, and a body part configured to surround the roof side part, the pillar part, and the roof cross part, in which two opposite ends of the roof side part are configured to be connected to roof side members of a vehicle body, a lower end of the pillar part is configured to be connected to a pillar member of the vehicle body, and an end of the roof cross part is configured to be connected to a roof cross member of the vehicle body.

16 Claims, 11 Drawing Sheets

VEHICLE BODY AND VEHICLE BODY CONNECTION JOINT FOR VEHICLE

CROSS REFERENCE TO RELATED APPLICATION

The present application claims under 35 U.S.C. § 119(a) the benefit of Korean Patent Application No. 10-2023-0124855, filed on Sep. 19, 2023, the entire contents of which are incorporated herein for all purposes by this reference.

BACKGROUND

Technical Field

The present disclosure relates to a vehicle body and a vehicle body connection joint for a vehicle, which are capable of ensuring the rigidity of the vehicle body and coping with various vehicle specifications by changing a way to connect respective members by means of the connection joint and changing a shape of the connection joint.

Background

A purpose-built vehicle (PBV) includes a life module configured to define passenger and loading spaces having various shapes in accordance with the market demand, and a drive module substantially related to the driving of the vehicle. The life module, which may meet various demands, may be coupled to the common drive module, such that various types of vehicles may be easily produced, which makes it possible to very effectively follow the market trend of diversified small-quantity production.

Meanwhile, among members included in a vehicle body of the vehicle, a vehicle body roof side member, which is provided at a roof side of the vehicle, a vehicle body pillar member, which is provided at a pillar side, and a vehicle body roof cross member, which is provided at a roof cross side, importantly serve not only to support a roof of the vehicle, but also to improve rigidity and safety of the vehicle body. In addition, connection joints may be provided at branch points of the roof side member, the pillar member, and the roof cross member and connect the respective members.

In the related art, the members are generally coupled by means of flange-connection or $CO_2$ welding, or a die-casting joint is generally provided to connect the members. However, the coupling method using the flange-connection or $CO_2$ welding results in a quadrangular tubular structure that is difficult to couple to an outer panel, which increases the number of components required for the coupling. The coupling method using the die-casting joint is disadvantageous in terms of price competitiveness because of the high cost of the joint.

Therefore, there is a need for a connection joint for a vehicle, which is capable of ensuring the rigidity of the vehicle body and coping with various vehicle specifications without causing an increase in number of components required to couple the members.

The foregoing explained as the background is intended merely to aid in the understanding of the background of the present disclosure, and is not intended to mean that the present disclosure falls within the purview of the related art that is already known to those skilled in the art.

SUMMARY OF THE DISCLOSURE

The present disclosure is proposed to solve these problems and aims to provide a vehicle body and a vehicle body connection joint for a vehicle, which are capable of ensuring rigidity of the vehicle body and coping with various vehicle specifications by changing a way to connect respective members by means of the connection joint in a connection joint structure of the vehicle body and changing a shape of the connection joint.

Technical problems to be solved by the present disclosure are not limited to the above-mentioned technical problems, and other technical problems, which are not mentioned above, may be clearly understood from the following descriptions by those skilled in the art to which the present disclosure pertains.

In order to achieve the above-mentioned object, the present disclosure provides a vehicle body connection joint for a vehicle, the vehicle body connection joint including: a support body including a roof side part extending along a roof side, a pillar part extending along a pillar, and a roof cross part extending along a roof cross; and a body part configured to surround the roof side part, the pillar part, and the roof cross part, in which roof side members of a vehicle body are connected to two opposite ends of the roof side part, a pillar member of the vehicle body is connected to a lower end of the pillar part, and a roof cross member of the vehicle body is connected to an end of the roof cross part. The vehicle body connection joint may be injection-molded.

For example, the roof side part, the pillar part, and the roof cross part of the support body may be disposed to be orthogonal to one another, and an end of the pillar part and an end of the roof cross part may be in surface contact with one surface of the roof side part.

For example, the two opposite ends of the roof side part, the lower end of the pillar part, and the end of the roof cross part may protrude outward from ends injection-molded toward surfaces of the roof side part, the pillar part, and the roof cross part of the body part.

For example, the roof side part and the pillar part may be respectively connected to the roof side member of the vehicle body and the pillar member of the vehicle body in a state in which the roof side part and the pillar part are respectively fitted with the roof side member of the vehicle body and the pillar member of the vehicle body.

For example, a bonding agent may be applied at points at which the roof side part and the pillar part are respectively fitted with the roof side member of the vehicle body and the pillar member of the vehicle body. The bonding agent may include epoxy or urethane.

For example, the two opposite ends of the roof side part and the end of the roof cross part may be respectively fixed to the roof side member and the roof cross member of the vehicle body by bolting in an upward/downward direction, and the lower end of the pillar part may be fixed to the pillar member of the vehicle body by bolting in a width direction of the vehicle body.

For example, the body part may be formed in a curved shape curved inward so that ends injection-molded toward surfaces of the roof side part, the pillar part, and the roof cross part are connected to one another.

For example, the body part may include a plurality of reinforcement ribs, and each of the reinforcement ribs may have a plurality of through-holes formed at predetermined intervals to define an internal pattern.

For example, an accommodation groove recessed downward may be formed in an upper surface of the body part, and the roof cross member may be connected to the body part by bolting in an upward/downward direction in a state in which the roof cross member is supported in the accommodation groove.

For example, a surface of the support body may be subjected to laser texturing, and the body part may be fixed to the surface of the support body in the state in which the body part surrounds the support body.

The present disclosure provides a vehicle body including: the vehicle body connection joint of claim 1, in which the vehicle body connection joint is provided as a plurality of vehicle body connection joints, and each of the connection joints is disposed along the roof side of the vehicle and connected to the roof side member, the pillar member, and the roof cross member of the vehicle body.

For example, the vehicle body may further include: an outer panel provided outside the roof side member, the pillar member, and the roof cross member of the vehicle body and configured to cover an outer side of the vehicle body, in which the outer panel is coupled and fixed to the roof side member by means of a bonding agent applied at a point at which the outer panel is joined to the roof side member of the vehicle body.

For example, the outer panel may have a fixing part protruding inward, and the fixing part may be fitted with one side of the pillar member of the vehicle body so that the outer panel is fixed to the pillar member.

According to the vehicle body and the vehicle body connection joint for a vehicle of the present disclosure, it is possible to ensure the rigidity of the vehicle body and cope with various vehicle specifications by changing the way to connect the respective members by means of the connection joint in the connection joint structure of the vehicle body and changing the shape of the connection joint.

In another embodiment, vehicles are provided that comprise an apparatus as disclosed herein.

The effects capable of being obtained by the present disclosure are not limited to the aforementioned effects, and other effects, which are not mentioned above, will be clearly understood by those skilled in the art from the following description.

DETAILED DESCRIPTION OF THE DISCLOSURE

Figure 1:
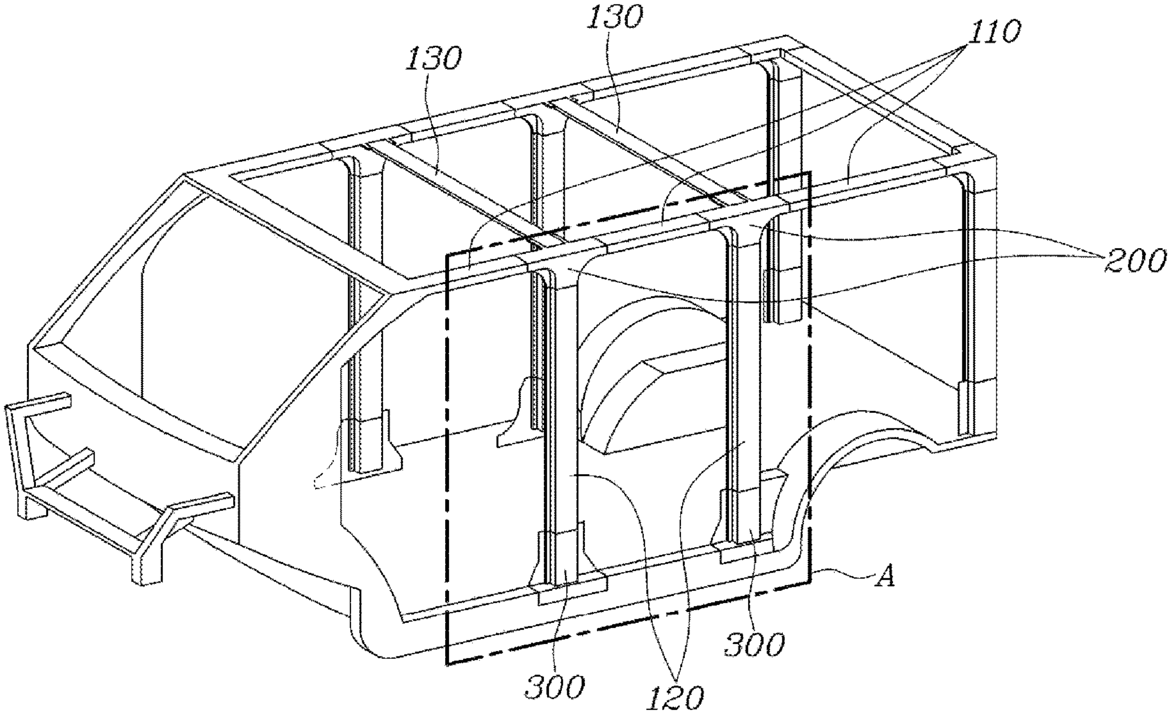
FIG. 1 is a view illustrating a vehicle body according to an exemplary embodiment of the present disclosure.

Hereinafter, embodiments disclosed in the present specification will be described in detail with reference to the accompanying drawings. The same or similar constituent elements are assigned with the same reference numerals regardless of reference numerals, and the repetitive description thereof will be omitted.

The suffixes "module", "unit", "part", and "portion" used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure. The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

An exemplary embodiment of the present disclosure proposes to change a way to connect respective members by means of a connection joint in a connection joint structure of a vehicle body and change a shape of the connection joint.

Prior to the description of a vehicle body connection joint for a vehicle according to the present disclosure, a vehicle body including a connection joint will be described.

Figure 2:
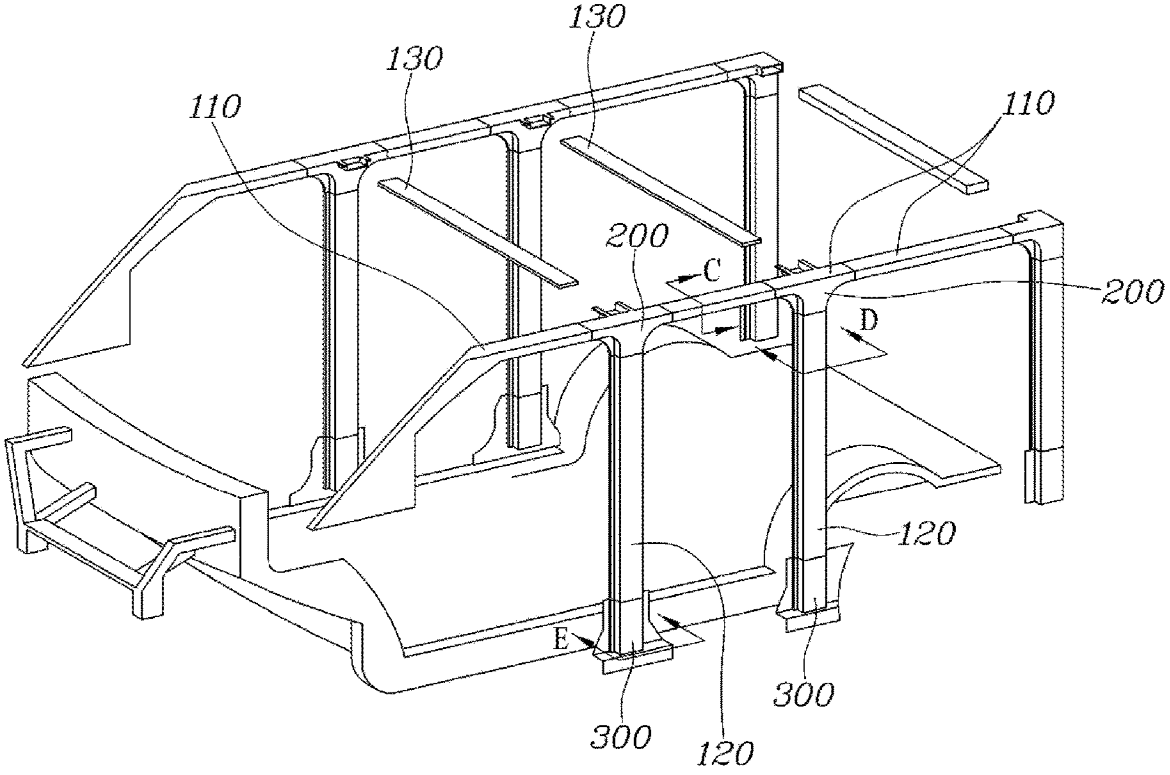
FIG. 2 is a view illustrating, in detail, components of the vehicle body according to the embodiment of the present disclosure.

FIGS. 1 and 2 are views illustrating the vehicle body according to the embodiment of the present disclosure. FIGS. 1 and 2 are mainly focused on constituent elements related to the present embodiment. However, an actually implemented vehicle body may, of course, include more or fewer constituent elements.

With reference to FIGS. 1 and 2, the vehicle body may include roof side members 110, pillar members 120, and roof cross members 130. The roof side member 110 extends in a length direction of the vehicle along a roof side, and the pillar member 120 extends in an upward/downward direction along a pillar of the vehicle. In addition, the roof cross member 130 extends in a width direction of the vehicle along a roof cross. The members may be provided as a plurality of members connected to one another so that left and right sides of the vehicle body are symmetric. The members are disposed to be orthogonal to one another at an upper side of the vehicle body by means of connection joints 200. In addition, the pillar members 120 extending in the upward/downward direction of the vehicle may be connected to a lower frame by means of lower joints 300 at a lower side of the vehicle body. In a state in which the vehicle body connection joint 200 to be described below may be used in common, a length of each of the members may be adjusted by cutting the member, thereby coping with different specifications of the vehicle. The description of the present disclosure will be focused on region A that is one side of a symmetric region.

Hereinafter, the vehicle body connection joint 200 will be described with reference to FIG. 3.

Figure 3:
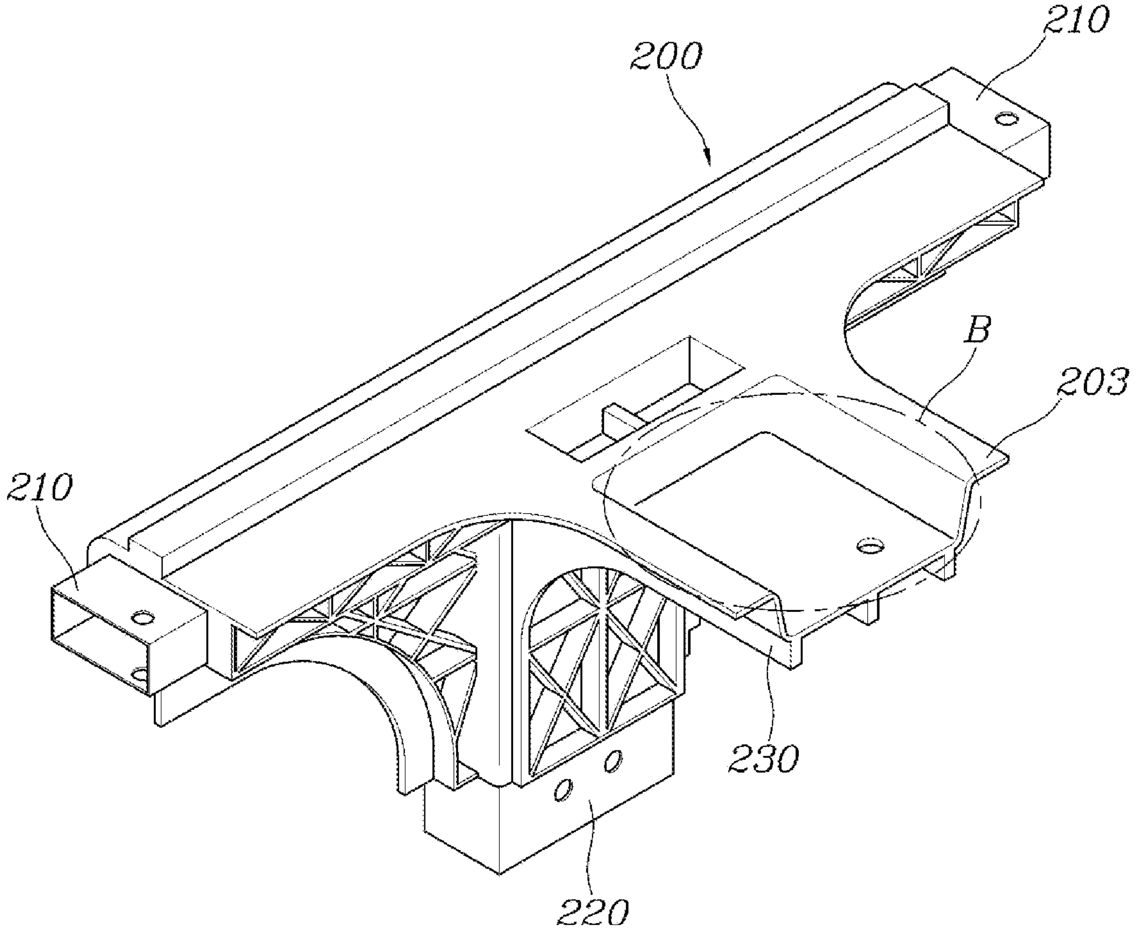
FIG. 3 is a view illustrating a vehicle body connection joint for a vehicle according to the embodiment of the present disclosure.

FIG. 3 is a view illustrating the vehicle body connection joint 200 according to the embodiment of the present disclosure.

With reference to FIG. 3, the vehicle body connection joint 200 may include a support body and a body part. Further, the support body includes a roof side part 210, a pillar part 220, and a roof cross part 230. The roof side part 210 may extend along the roof side, the pillar part 220 may extend along the pillar, and the roof cross part 230 may extend along the roof cross. The roof side part 210, the pillar part 220, and the roof cross part 230, which constitute the support body, are connected to one another at ends thereof to define a single support structure, and the components may be disposed to be orthogonal to one another. In this case, the end of the pillar part 220 and the end of the roof cross part 230 may be in surface contact with one surface of the roof side part 210, thereby ensuring the rigidity of the support body.

In addition, the body part is formed to surround the support body including the roof side part 210, the pillar part 220, and the roof cross part 230. In this case, the support body and the body part may be made of a metallic material or a composite material to ensure the rigidity of the connection joint 200. In this case, the composite material may be a 3D printing material such as plastic, aluminum, and polyethylene (PE), for example. However, the present disclosure is not necessarily limited thereto.

A shape of the body part will be described. The body part may be formed in a curved shape curved inward so that ends of the body part injection-molded toward surfaces of the roof side part 210, the pillar part 220, and the roof cross part 230 are connected to one another. With the curved shape protruding and curved inside the connection joint 200, a stepped portion may be reinforced and load transmission may be improved when each of the members and the connection joint 200 are connected. In addition, the body part may include a plurality of reinforcement ribs. A plurality of through-holes may be formed at predetermined intervals in the reinforcement ribs constituting the body part, thereby defining an internal pattern. With the above-mentioned structure, costs and a weight of the body part may be reduced.

FIG. 3 an accommodation groove B may be formed in an extension end portion of an upper surface of the body part connected to the roof cross member 130. The accommodation groove B may be formed in a shape recessed downward from the upper surface of the body part. The roof cross member 130 may be connected to the body part by bolting in the upward/downward direction in a state in which the roof cross member 130 is supported in the accommodation groove B. A flange portion 203 may restrict a lateral movement of the roof cross member 130 on an inner surface of the accommodation groove B in a state in which the roof cross member 130 is seated in the accommodation groove B, thereby improving roof strength against a forward/rearward collision of the vehicle.

In addition, two opposite ends of the roof side part 210, a lower end of the pillar part 220, and an end of the roof cross part 230 may protrude outward from the ends extending by injection-molded toward the surfaces of the roof side part 210, the pillar part 220, and the roof cross part 230 of the body part. The end of the roof side part 210, the end of the pillar part 220, and the end of the roof cross part 230 may be connected to one another so as to be coupled and fastened to the roof side member 110, the pillar member 120, and the roof cross member 130.

A way to connect the respective members by means of the connection joint 200 will be described with reference to FIGS. 4 to 9.

Figure 4:
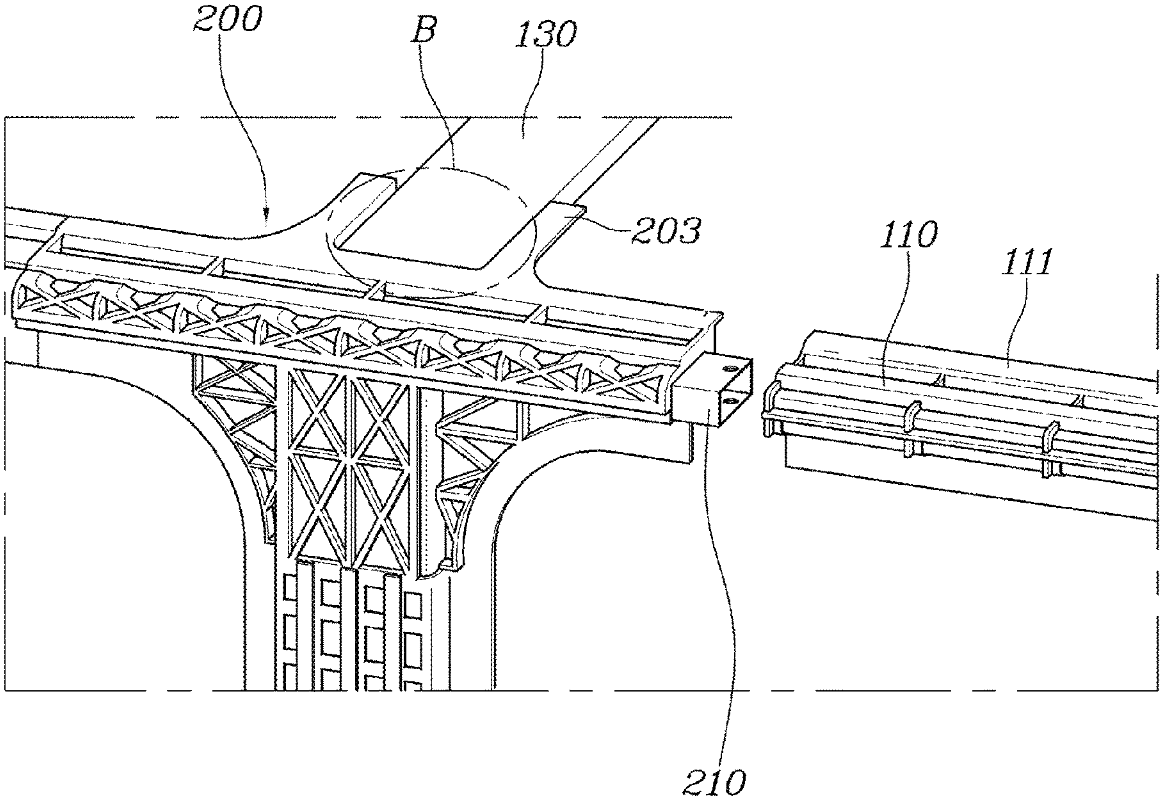
FIGS. 4 and 5 are views illustrating a connection structure between a connection joint and a roof side member in region C in FIG. 2.
Figure 5:
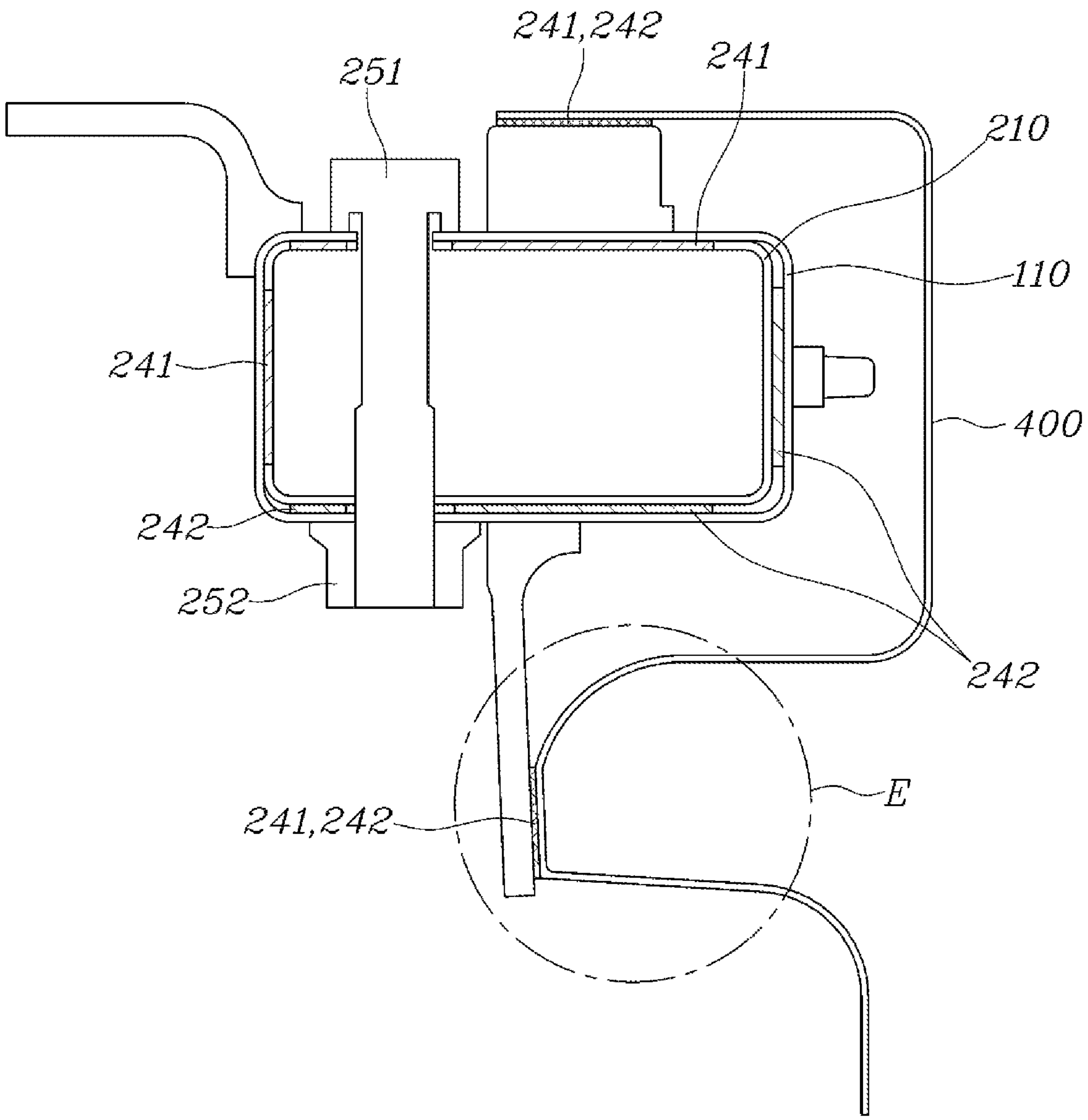
Figure 6:
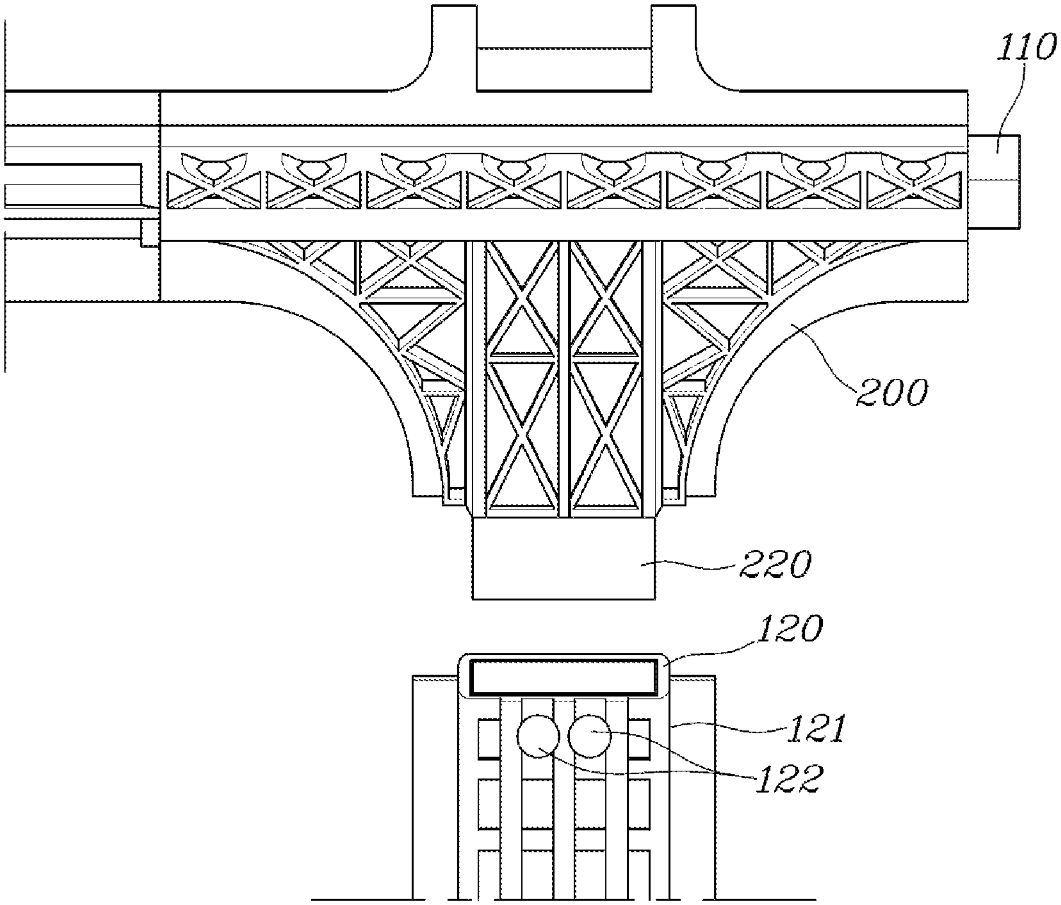
FIGS. 6 and 7 are views illustrating a connection structure between the connection joint and a pillar member in region D in FIG. 2.
Figure 7:
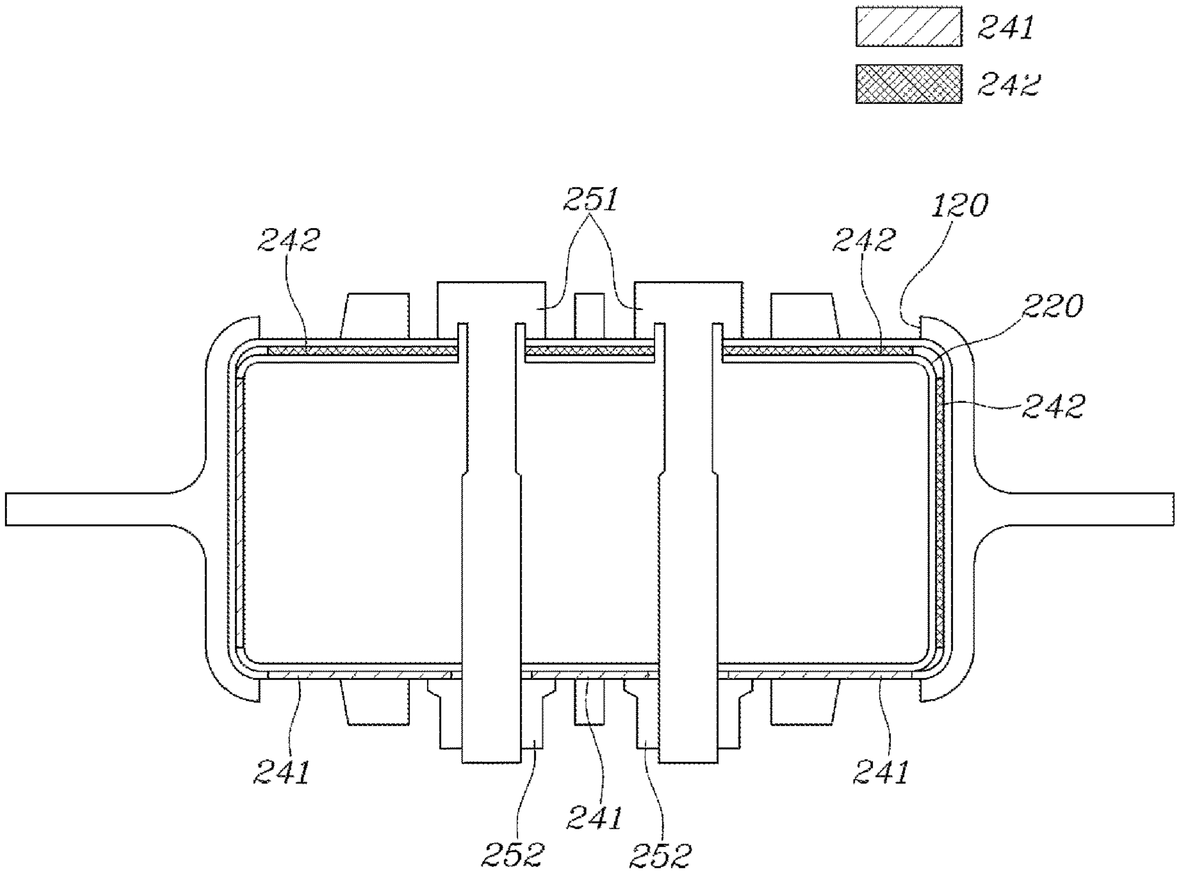

FIGS. 4 and 5 are views illustrating a connection structure between the connection joint 200 and the roof side member 110 in region C in FIG. 2, and FIGS. 6 and 7 are views illustrating a connection structure between the connection joint 200 and the pillar member 120 in region D in FIG. 2.

With reference to FIGS. 4 and 5, the roof side part 210 may be connected to the roof side member 110 of the vehicle body. More specifically, two opposite ends of the roof side part 210 may be fixed by bolting in a state in which the two opposite ends of the roof side part 210 are fitted with the roof side members 110 of the vehicle body. Overlap portions where the roof side member 110 and the roof side part 210 overlap each other may be formed, and the overlap portions may be fastened in the upward/downward direction. A nut 252 is fastened to a lower surface of the roof side member 110, and a bolt 251 is fastened downward to an upper surface of the roof side member 110 and connected to the nut 252. The bolt 251 is fastened while penetrating the roof side part 210 in the upward/downward direction of the vehicle body. In addition, an outer panel 400 has a recess region E bent inward. The recess region E may be connected to the roof side member 110 by means of a bonding agent including an epoxy material 241 or a urethane material 242.

In this case, the epoxy material 241 or the urethane material 242 is applied at a point between the roof side member 110 and the roof side part 210 that are fitted with each other, thereby further improving the connection rigidity. Unlike the epoxy material 241, the urethane material 242 has elasticity, and thus the urethane material 242 is applied to a portion to which tolerance is applied. The epoxy material 241 may be applied to a portion where the roof side member 110 and the roof side part 210 are in direct contact with each other. In addition, the structure in which the roof cross part 230 and the roof cross member 130 of the vehicle body are connected by bolting is identical to the connection structure between the roof side part 210 and the roof side member 110 of the vehicle body. The above-mentioned fitting and bolt-fastening structure may provide the plurality of members with an impact force against a broadside collision of the vehicle and improve the bending rigidity of the vehicle body.

With reference to FIGS. 6 and 7, the pillar part 220 may be connected to the pillar member 120 of the vehicle body. More specifically, the lower end of the pillar part 220 may be fixed to the pillar member 120 of the vehicle body by bolting. A hollow portion 121 is formed in an outer side of the pillar member 120, and first fastening holes 122 are formed through the hollow portion 121 and the pillar member 120. The bolts 251 are fastened and connected to an outer surface of the pillar member 120, the nuts 252 are fastened and connected to an inner surface of the pillar member 120, and the bolts 251 are fastened while penetrating the pillar part 220 in the width direction of the vehicle body.

Overlap portions where the pillar member 120 and the pillar part 220 overlap each other may be formed, and the overlap portions may be fastened in the upward/downward direction. In this case, a bonding agent may be applied at a point at which the pillar member 120 and the pillar part 220 are fitted with each other, thereby further improving the connection rigidity. The bonding agent may be applied onto at least two surfaces among the four surfaces on which the pillar member 120 and the pillar part 220 are in contact with each other, thereby ensuring the rigidity against deformation. The above-mentioned fitting and bolt-fastening structure may provide the plurality of members with an impact force against a broadside collision of the vehicle and improve the rigidity of the vehicle body. The hollow portions 111 and 121 may have a plurality of through-holes and cover an outer side of the roof side member 110 and an outer side of the pillar member 120, thereby improving the durability of the members against external impact.

Figure 8:
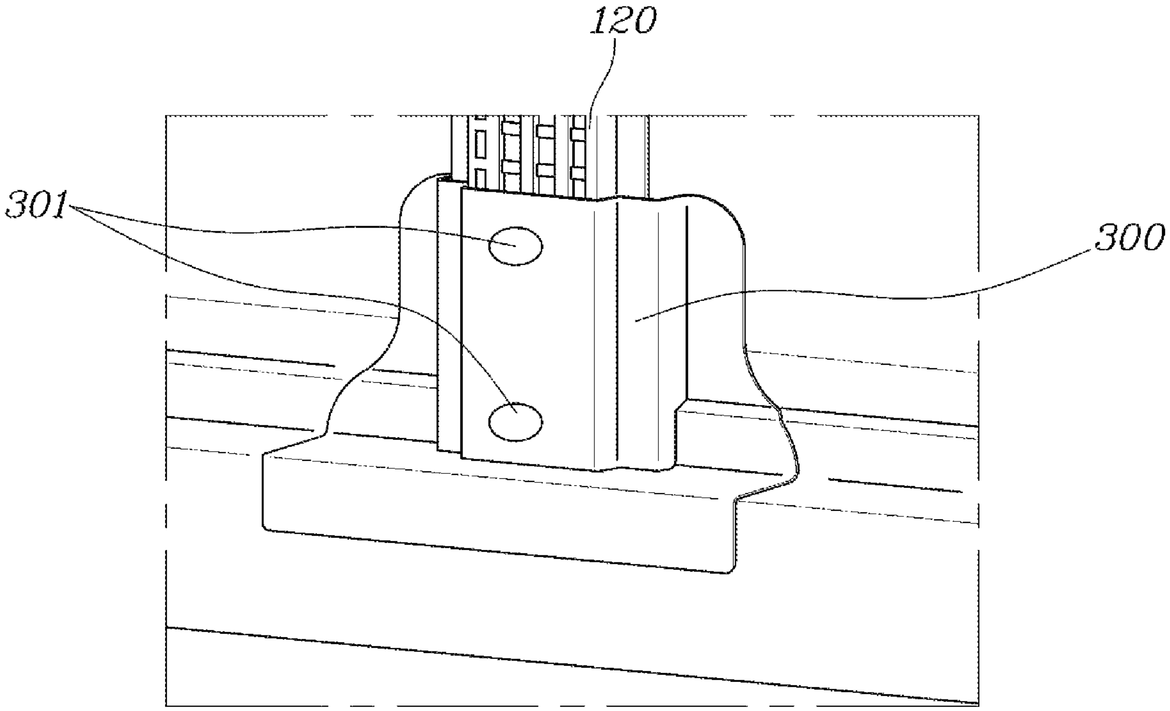
FIGS. 8 and 9 are views illustrating a connection structure between a lower joint and the pillar member in region E in FIG. 2.
Figure 9:
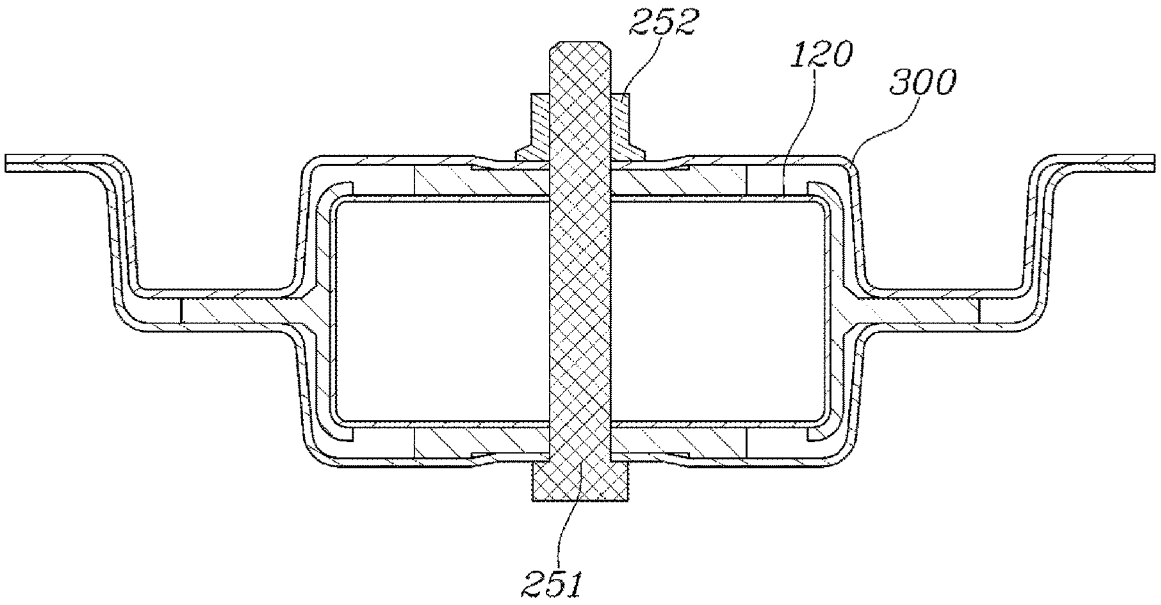

FIGS. 8 and 9 are views illustrating a connection structure between the lower joint 300 and the pillar member 120 in region E in FIG. 2.

With reference to FIGS. 8 and 9, a lower portion of the pillar member 120 may be inserted into the lower joint 300 and fastened to the lower joint 300 by bolting in the width direction of the vehicle body. The lower joint 300 has second fastening holes 301 formed through the hollow portion 121 and the pillar member 120. The bolt 251 is inserted into the first fastening hole 122, and the nut 252 is fastened to an inner surface of the lower joint 300, such that the bolt 251 is fastened while penetrating the pillar part 220. The above-mentioned bolt fastening structure may provide the plurality of members with an impact force against a broadside collision of the vehicle and improve the connectivity between the roof part and the lower frame of the vehicle body.

Figure 10:
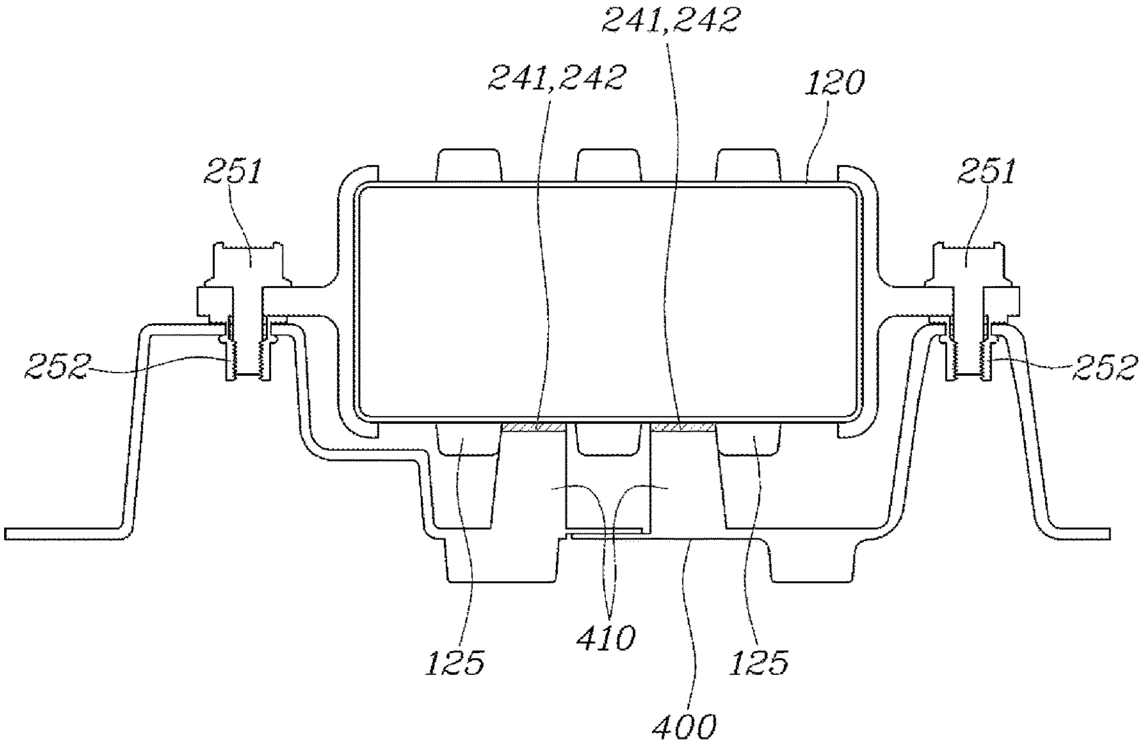
FIG. 10 is a view illustrating a fixing structure for the pillar member and an outer panel according to the embodiment of the present disclosure.

FIG. 10 is a view illustrating a fixing structure for the pillar member 120 and the outer panel 400 according to the embodiment of the present disclosure.

With reference to FIG. 10, the pillar member 120 and the outer panel 400 may be fixed by being fitted with each other. The outer panel 400 may have fixing parts 410 protruding inward. The fixing parts 410 are matched with the fixing parts 410 in a space between fitting parts 125 recessed toward the inside of the pillar member 120 of the vehicle body. The urethane material 240 or the epoxy material 241 may be applied onto the portions where the fixing parts 410 are in contact with the pillar member 120 in the state in which the fixing parts 410 and the fitting parts 125 are matched with each other, such that the outer panel 400 may be fixed. In case that an impact force is applied to the outer panel 400 through the above-mentioned fitting coupling structure, the impact force against a broadside collision may be transmitted to the plurality of members, and the coupling rigidity of the pillar member 120 and the outer panel 400 may be improved.

Figure 11:
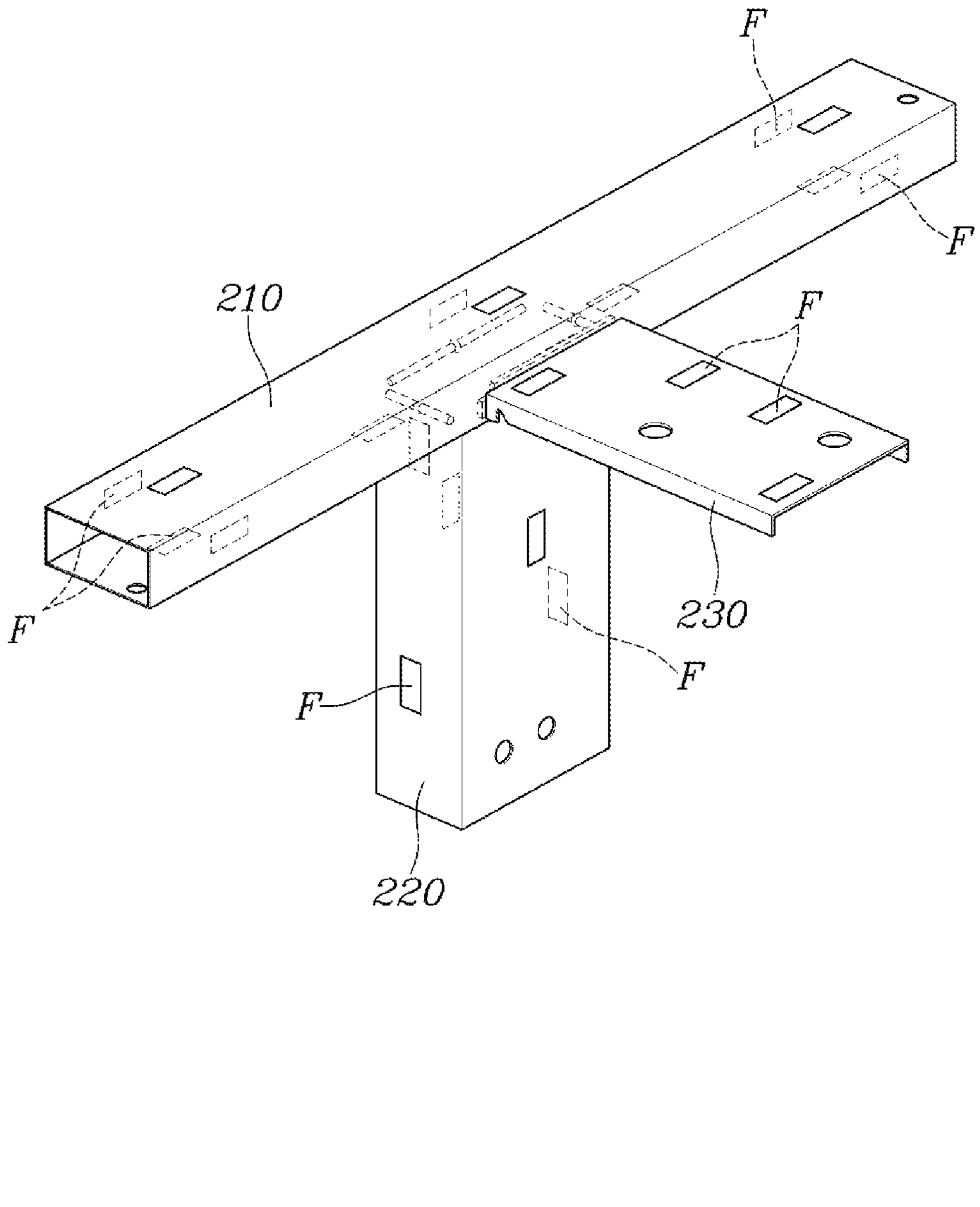
FIG. 11 is a view illustrating a state in which a surface of a support body according to the embodiment of the present disclosure is subjected to laser texturing.

FIG. 11 is a view illustrating a state in which the surface of a support body according to the embodiment of the present disclosure is subjected to laser texturing.

With reference to FIG. 11, a surface of the support body may be subjected to laser texturing. This is to easily fix the body part to the surface of the support body in the state in which the body part surrounds the support body. In this case, the surface of the support body may be maintained at a predetermined interval in consideration of thermal deformation during the laser texturing.

According to the embodiments of the present disclosure described above, it is possible to ensure the rigidity of the vehicle body and cope with various vehicle specifications by changing the way to connect the respective members by means of the connection joint in the connection joint structure of the vehicle body and changing the shape of the connection joint.

While the specific embodiments of the present disclosure have been illustrated and described, it will be obvious to those skilled in the art that the present disclosure may be variously modified and changed without departing from the technical spirit of the present disclosure defined in the appended claims.

DESCRIPTION OF REFERENCE NUMERALS

110: Roof side member
111, 121: Hollow portion
120: Pillar member
122: First fastening hole
125: Fitting part
130: Roof cross member
200: Connection joint
203: Flange portion
210: Roof side part
220: Pillar part
230: Roof cross part
241: Epoxy material
242: Urethane material
251: Bolt
252: Nut
300: Lower joint
301: Second fastening hole
400: Outer panel
410: Fixing part

What is claimed is:

1. A vehicle body connection joint for a vehicle, the vehicle body connection joint comprising:

a support body comprising a roof side part extending along a roof side, a pillar part extending along a pillar, and a roof cross part extending along a roof cross; and a body part configured to surround the roof side part, the pillar part, and the roof cross part, wherein two opposite ends of the roof side part are configured to be connected to roof side members of a vehicle body, a lower end of the pillar part is configured to be connected to a pillar member of the vehicle body, and an end of the roof cross part is configured to be connected to a roof cross member of the vehicle body;

wherein an accommodation groove recessed downward is formed in an upper surface of the body part, and the roof cross member is connected to the body part by bolting in an upward/downward direction in a state in which the roof cross member is supported in the accommodation groove.

2. The vehicle body connection joint of claim 1, wherein the roof side part, the pillar part, and the roof cross part of the support body are disposed to be orthogonal to one another, and an end of the pillar part and an end of the roof cross part are in surface contact with one surface of the roof side part.

3. The vehicle body connection joint of claim 1, wherein the two opposite ends of the roof side part, the lower end of the pillar part, and the end of the roof cross part protrude outward from ends injection-molded toward surfaces of the roof side part, the pillar part, and the roof cross part of the body part.

4. The vehicle body connection joint of claim 1, wherein the roof side part and the pillar part are respectively connected to the roof side member of the vehicle body and the pillar member of the vehicle body in a state in which the roof side part and the pillar part are respectively fitted with the roof side member of the vehicle body and the pillar member of the vehicle body.

5. The vehicle body connection joint of claim 4, wherein a bonding agent is applied at points at which the roof side part and the pillar part are respectively fitted with the roof side member of the vehicle body and the pillar member of the vehicle body.

6. The vehicle body connection joint of claim 5, wherein the bonding agent comprises epoxy or urethane.

7. The vehicle body connection joint of claim 1, wherein the two opposite ends of the roof side part and the end of the roof cross part are respectively fixed to the roof side member and the roof cross member of the vehicle body by bolting in an upward/downward direction, and the lower end of the pillar part is fixed to the pillar member of the vehicle body by bolting in a width direction of the vehicle body.

8. The vehicle body connection joint of claim 1, wherein the body part is formed in a curved shape curved inward of the body part so that ends of the roof side part, the pillar part, and the roof cross part are connected to one another.

9. The vehicle body connection joint of claim 1, wherein the body part comprises a plurality of reinforcement ribs, and each of the reinforcement ribs has a plurality of through-holes formed at predetermined intervals to define an internal pattern.

10. The vehicle body connection joint of claim 1, wherein a surface of the support body is subjected to laser texturing, and the body part is fixed to the surface of the support body in the state in which the body part surrounds the support body.

11. The vehicle body connection joint of claim 1 is injection-molded.

12. A vehicle comprising the vehicle body connection joint of claim 1.

13. A vehicle body comprising:

the vehicle body connection joint of claim 1, wherein the vehicle body connection joint is provided as a plurality of vehicle body connection joints, and each of the connection joints is disposed along the roof side of the vehicle and connected to the roof side member, the pillar member, and the roof cross member of the vehicle body.

14. The vehicle body of claim 13, further comprising:

an outer panel provided outside the roof side member, the pillar member, and the roof cross member of the vehicle body and configured to cover an outer side of the vehicle body.

15. The vehicle body of claim 14, wherein the outer panel is coupled and fixed to the roof side member by means of a bonding agent applied at a point at which the outer panel is joined to the roof side member of the vehicle body.

16. The vehicle body of claim 14, wherein the outer panel has a fixing part protruding inward, and the fixing part is fitted with one side of the pillar member of the vehicle body so that the outer panel is fixed to the pillar member.

* * * * *